United States Patent
Srinivasan et al.

(10) Patent No.: US 7,617,488 B2
(45) Date of Patent: Nov. 10, 2009

(54) METHOD AND APPARATUS AND DETERMINING PROCESSOR UTILIZATION

(75) Inventors: Vasudevan Srinivasan, Hillsboro, OR (US); Avinash P. Chakravarthy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 10/750,395

(22) Filed: Dec. 30, 2003

(65) Prior Publication Data

US 2005/0149929 A1    Jul. 7, 2005

(51) Int. Cl.
  *G06F 9/44* (2006.01)
  *G06F 9/45* (2006.01)

(52) U.S. Cl. ............... 717/130; 717/127; 717/131; 717/149; 717/154

(58) Field of Classification Search ............. None
  See application file for complete search history.

(56) References Cited

U.S. PATENT DOCUMENTS

| | | | |
|---|---|---|---|
| 5,021,679 A | | 6/1991 | Fairbanks et al. |
| 5,072,376 A | | 12/1991 | Ellsworth |
| 5,153,535 A | | 10/1992 | Fairbanks et al. |
| 5,168,554 A | * | 12/1992 | Luke .................. 715/509 |
| 5,307,003 A | | 4/1994 | Fairbanks et al. |
| 5,384,906 A | * | 1/1995 | Horst .................. 713/375 |
| 5,627,412 A | | 5/1997 | Beard |
| 5,752,011 A | | 5/1998 | Thomas et al. |
| 5,903,730 A | * | 5/1999 | Asai et al. ............ 709/224 |
| 5,974,557 A | | 10/1999 | Thomas et al. |
| 6,018,759 A | | 1/2000 | Doing et al. |
| 6,216,235 B1 | | 4/2001 | Thomas et al. |
| 6,487,668 B2 | | 11/2002 | Thomas et al. |
| 6,609,211 B2 | | 8/2003 | Atkinson |
| 6,711,526 B2 | | 3/2004 | Cooper |
| 6,816,809 B2 | * | 11/2004 | Circenis .............. 702/178 |
| 2004/0059956 A1 | | 3/2004 | Chakravarthy |
| 2004/0199919 A1 | * | 10/2004 | Tovinkere ........... 718/102 |

FOREIGN PATENT DOCUMENTS

EP    0422945    4/1991

OTHER PUBLICATIONS

"Advanced Configuration and Power Interface Specification", Revision 2.0c, Jun. 30, 2004, Compaq/Intel/Microsoft/Phoenix/Toshiba, pp. 1-488.
Office Action dated Jun. 6, 2005 for U.S. Appl. No. 10/251,202, filed Sep. 20, 2002, 12 pages.
Office Action dated Jul. 19, 2006 for European Patent Application No. 04031040.1, filed Dec. 30, 2004, 5 pages.
Office Action dated Jan. 10, 2007 for U.S. Appl. No. 10/251,202, filed Sep. 20, 2002, 13 pages.
Office Action dated Jun. 18, 2007 for U.S. Appl. No. 10/251,202, filed Sep. 20, 2002, 13 pages.
Office Action dated Sep. 6, 2006 for U.S. Appl. No. 10/251,202, filed Sep. 20, 2002, 17 pages.
Office Action dated Mar. 23, 2006 for U.S. Appl. No. 10/251,202, filed Sep. 20, 2002, 15 pages.
Office Action dated Oct. 7, 2005 for U.S. Appl. No. 10/251,202, filed Sep. 20, 2002, 15 pages.

* cited by examiner

*Primary Examiner*—Chuck O Kendall
(74) *Attorney, Agent, or Firm*—Blakely, Sokoloff, Taylor & Zafman LLP

(57) ABSTRACT

A method and an apparatus for determining processor utilization have been disclosed. In one embodiment, the method includes determining processor utilization in a data processing system and synchronizing execution of a number of threads in the data processing system to prevent interrupting the determining of the processor utilization. Other embodiments have been claimed and described.

13 Claims, 8 Drawing Sheets

000
METHOD AND APPARATUS AND DETERMINING PROCESSOR UTILIZATION

FIELD

Embodiments of the invention relate generally to a processing core in a data processing system, and more particularly, to determining the processor utilization.

BACKGROUND

In many data processing or computer systems, various tasks or applications contend for processing time to execute on one or more processors, also referred to as central processing units (CPU), or similar processing devices. Activity in many highly multi-tasking environments tends to be bursty, having periods of latency or inactivity followed by periods of intense processing activity. Accordingly, it is useful to analyze the utilization of processors and other similar data processing system devices for a variety of reasons. For example, high processor utilization during periods in which few or no user tasks are scheduled may be indicative of a virus program or of some correctable fault in task scheduling resulting in thrashing or other inefficient system behavior.

In theory, processor utilization may be determined by accumulating processor idle time across a sampling interval to determine the percentage of time the processor is inactive. An operating system (OS) may maintain a list of ready-to-run threads or tasks. A thread in the current description refers to a distinct process executed on a processor, which may be a physical processor or a logical processor. When this ready-to-run list is empty, no task is executed and the processor is idle. Accordingly, a processor-independent timer is read and the processor is essentially deactivated. The processor may be put in a predefined processor power state, such as the C2 or C3 states defined by the well known Advanced Configuration and Power Interface Specification, Revision 2.0, Jul. 27, 2000 (ACPI).

In the C2 state, clock signals are removed from the functional units of the processor while the memory subsystem remains active and "snoopable" by other devices. In a C3 state, the clock signal is also removed from the memory subsystems and hence, a so-called "deep sleep" state is entered. When a new task is added to the ready-to-run list, the processor is placed in an active state (such as the C0 ACPI state) and the timer is read again. The difference between the first and second timer reads multiplied by the timer's period represents the idle time of the processor. The accumulation of the idle time across a sampling interval can be used to determine the processor utilization. Unfortunately, this measure of processor utilization is difficult to calculate outside of the OS through a supported application programming interface (API) because the API is generally unaware of the ready-to-run list, which is typically known only to the OS.

An existing solution for the above problem is to use on-die performance counter hardware capable of counting clock ticks for which the processor is not in a low power state. The performance counter thus provides a measure of time the processor spent performing useful work. Software can then periodically sample a register of this performance counter, and calculate the processor utilization based on the following formulae:

BusyTicks=Sum(across sampling interval)[CurrentTickCount−InitialTickCount]

EffectiveFrequency=BusyTicks/SamplingInterval(s)

Processor utilization(%)=EffectiveFrequency/ActualFrequency*100%

However, the above technique does not apply satisfactorily to a system with simultaneous multi-threading (SMT) technology enabled (hereinafter, a SMT system) or a multi-processor system because of at least two issues, including the OS and the system interrupt mechanism.

Since the OS has multiple physical or logical processors in the multi-processor system or the SMT system, the OS scheduler can be executed on any one of the processors. The scheduler may preempt the thread that is calculating an effective frequency for determining the processor utilization in the middle of the frequency calculation. When the processor resumes execution of the thread, the sampling interval that the thread uses and the processor clock ticks may be out of sync, and thus, resulting in an incorrect frequency.

The second issue of the above technique involves the system interrupt mechanism, such as System Management Mode (SMM). SMM is a shared mode between all processors in a system. During SMM, the states of execution of all the processors are saved and the system enters SMM. When the system exits out of SMM, the state of the processors are restored and the execution resumes from where it was stopped. So, if the frequency calculating thread is executing on one processor and the other processor causes a switch to SMM, the frequency calculating thread is also halted and the system as a whole enters SMM. Upon exit from SMM, the frequency calculating thread is resumed as if nothing has happened. This could lead to an incorrect frequency calculation in determining the processor utilization.

BRIEF DESCRIPTION OF THE DRAWINGS

Embodiments of the present invention is illustrated by way of example and not limitation in the figures of the accompanying drawings, in which like references indicate similar elements and in which.

DETAILED DESCRIPTION

A method and an apparatus for determining processor utilization and/or effective frequency within a data processing system are disclosed. More particularly, in one embodiment, a method for determining processor utilization includes determining processor utilization in a data processing system and synchronizing execution of a number of threads in the data processing system to prevent interrupting the determining of the processor utilization.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various terms peculiar to nomenclature used by Intel Corporation of Santa Clara, Calif., will be used to describe signals and architectural components. The use of these terms is intended to be by way of example only and is thus non-limiting.

In the following detailed description, numerous specific details are set forth in order to provide a thorough understanding. However, it will be apparent to one of ordinary skill in the art that these specific details need not be used to practice some embodiments of the present invention. In other circumstances, well-known structures, materials, circuits, processes, and interfaces have not been shown or described in detail in order not to unnecessarily obscure the description.

Figure 1:
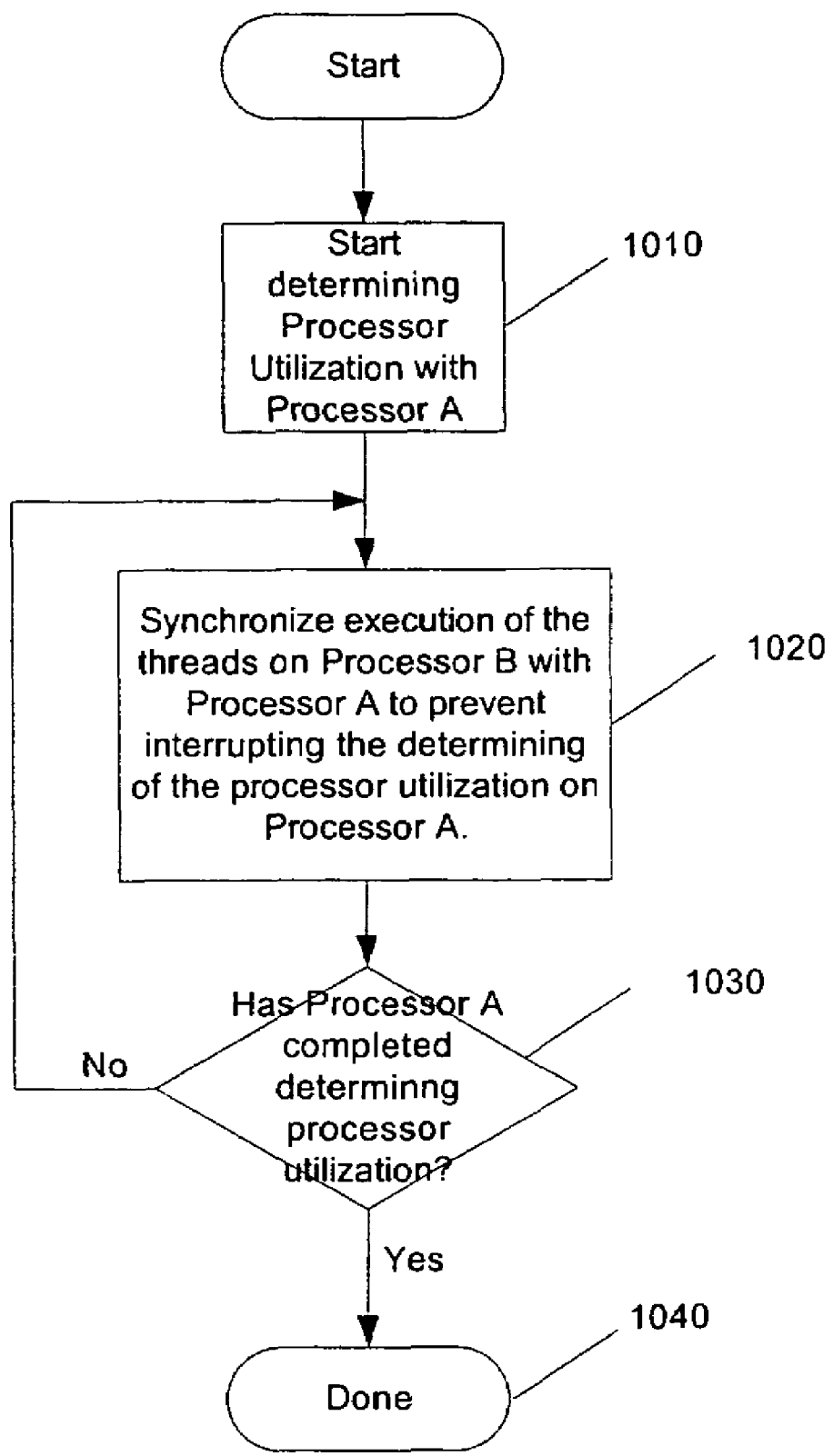
FIG. 1 shows a flow diagram of an embodiment of a process to determine processor utilization in an exemplary data processing system.

FIG. 1 shows a flow diagram of one embodiment of a process to determine processor utilization in a data processing system. Referring to FIG. 1, at block 1010, Processor A starts determining the processor utilization. At block 1020, the execution of the threads of Processor B is synchronized with Processor A to prevent interrupting the determining of the processor utilization on Processor A. At block 1030, Processor B determines whether Processor A has completed determining the processor utilization. If not, block 1020 is repeated. If Processor A has completed determining the processor utilization, the process ends at block 1040.

Figure 2:
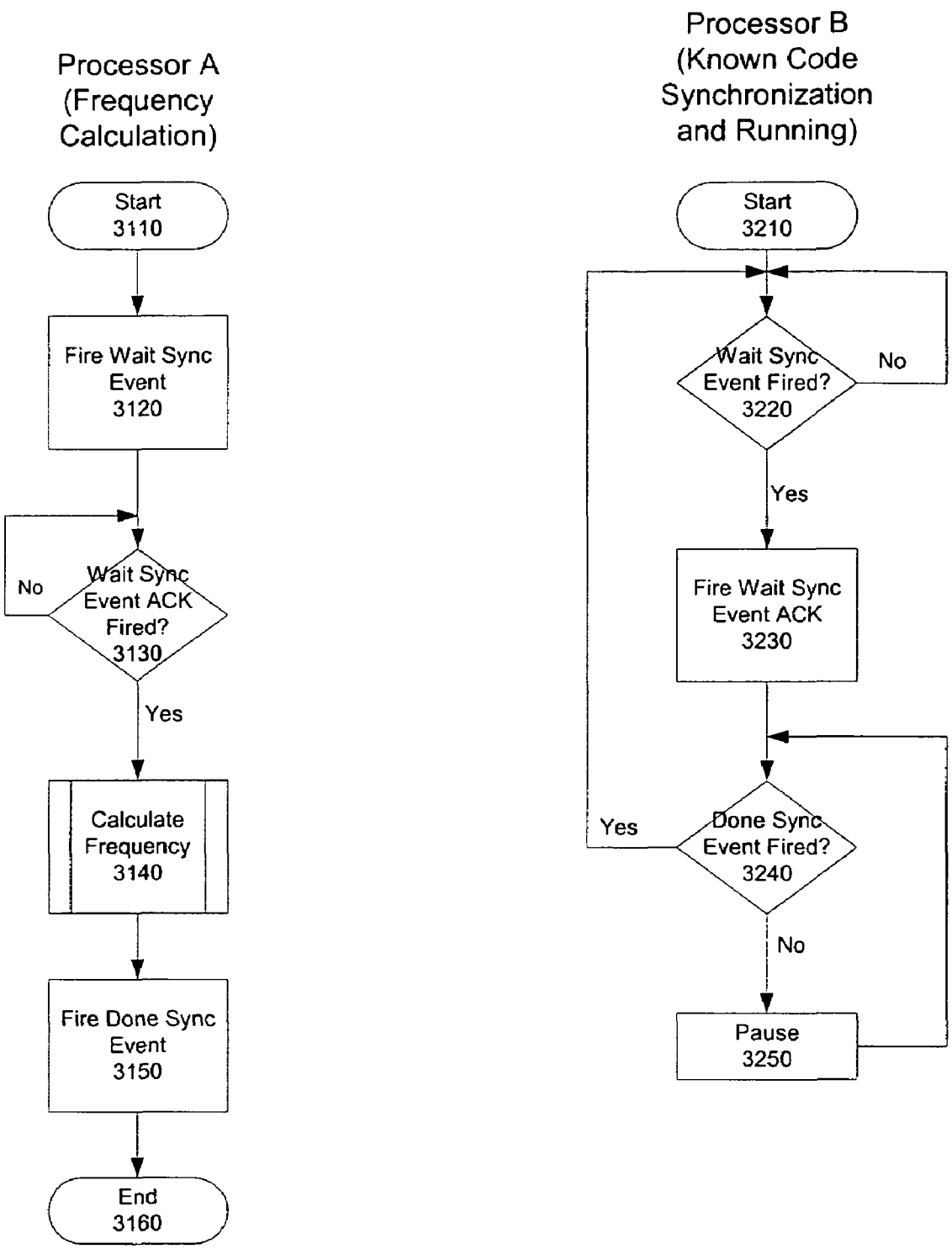
FIG. 2 shows a flow diagram of one embodiment of a process to determine processor utilization in an exemplary data processing system.

FIG. 2 illustrates a flow diagram of one embodiment of a process to determine processor utilization in an exemplary data processing system. One should appreciate that the exemplary data processing system may have SMT technology enabled to provide two or more logical processors to execute threads substantially in parallel. Alternatively, the exemplary data processing system may be a multiprocessor system having two or more physical processors to execute threads substantially in parallel, as opposed to the logical processors in the SMT system. For the purpose of illustration, the flow diagram in FIG. 2 is discussed below with references to two processors, Processor A and Processor B. However, the concept is applicable to systems having more than two processors. Furthermore, one should appreciate that Processor A and Processor B may be two distinct physical processors or logical processors as in the case of a multi-processor system or a SMT system.

Referring now to FIG. 2, at block 3110 and 3210, Processors A and B are started or initialized. At 3220, Processor B remains waiting until Processor A fires Wait Sync Event. At 3120, Processor A fires Wait Sync Event to indicate that Processor A is about to execute a thread to determine processor utilization of Processor A. Then at 3130, Processor A waits until Processor B fires Wait Sync Event ACK. After Processor A has fired Wait Sync Event, at block 3230, Processor B fires Wait Sync Event ACK to acknowledge Wait Sync Event has been fired by Processor A. After Processor B has fired Wait Sync Event ACK, at block 3140, Processor A starts to calculate an effective frequency of Processor A for determining processor utilization. The details of an exemplary embodiment of the process to calculate effective frequency are discussed below with references to FIGS. 3 to 5.

After calculating the effective frequency at block 3140, Processor A fires Done Sync Event at block 3150 and the thread running on Processor A ends at 3160. After firing Wait Sync Event ACK at block 3230, Processor B checks at 3240 whether Processor A has fired Done Sync Event at 3150. If not, Processor B pauses at 3250 and then returns to block 3240 to check again. Processor B repeats blocks 3240 and 3250 until Processor A fires Done Sync Event. After Processor A has fired Done Sync Event, Processor B repeats block 3220 to wait for Processor A to fire Wait Sync Event. By causing Processor B to repeat the checking and pausing operations at blocks 3240 and 3250, the thread running on Processor B and the frequency calculation thread running on Processor A are substantially synchronized and Processor B is prevented from causing an interrupt on Processor A, such as a System Management Interrupt (SMI), while Processor A is running the frequency calculation thread. As discussed above, such an interrupt may cause Processor A to halt in the middle of the frequency calculation, and consequently, to miscalculate the effective frequency of processor A. Therefore, preventing Processor B from causing an interrupt while Processor A is calculating the effective frequency helps to ensure the correct determination of processor utilization by Processor A.

Figure 3:
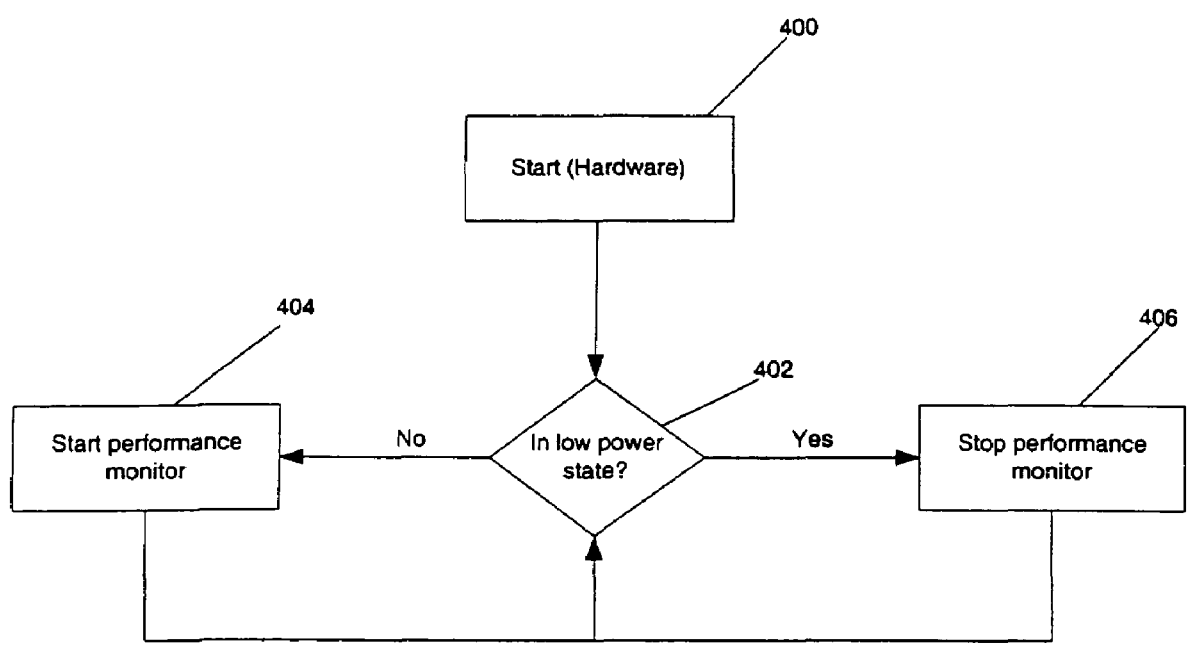
FIGS. 3 to 5 show flow diagrams of embodiments of a process to calculate effective frequency in an exemplary data processing system.
Figure 4:
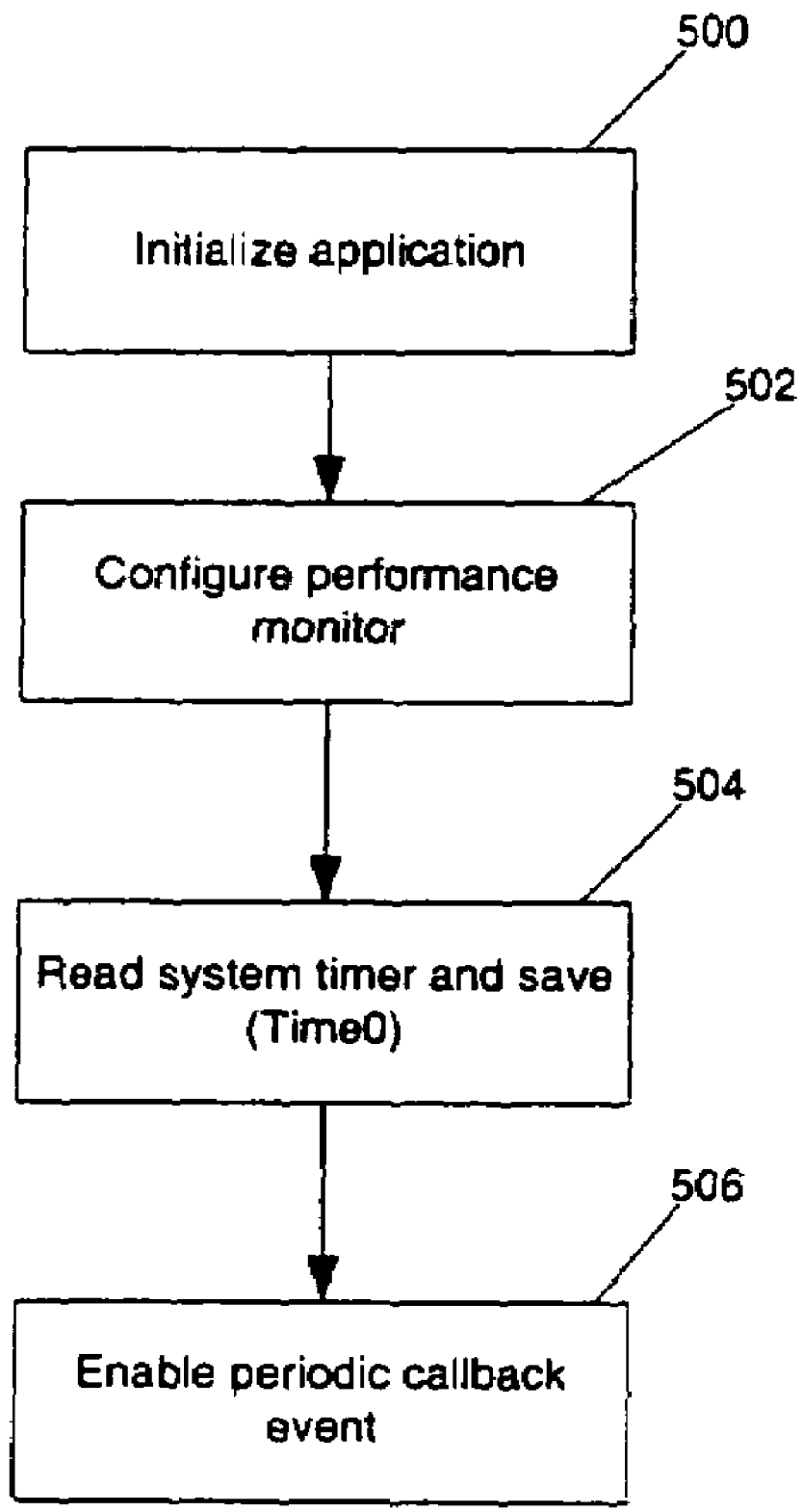
Figure 5:
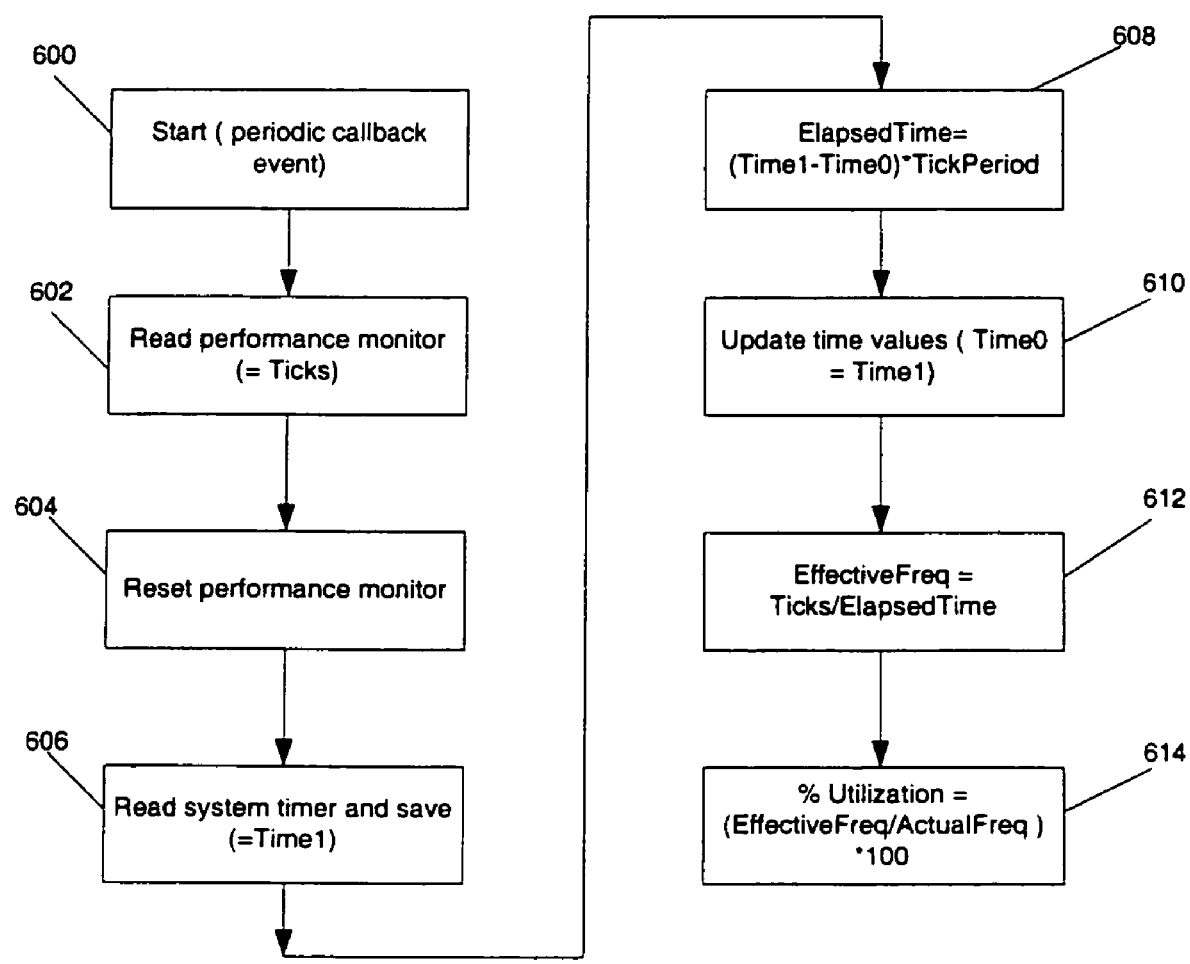

FIGS. 3 to 5 show flow diagrams of embodiments of a process to calculate effective frequency in an exemplary data processing system.

Referring to FIG. 3, at block 400, the platform hardware in an exemplary data processing system is initialized or started. At 402, the platform hardware determines if a processor in the data processing system is in a low power state. If the processor is not in a low power state then, at 404, a performance monitor counter in the data processing system is started. If at any stage during execution of the operations described, the hardware platform determines that the processor is in a low power state, then the performance monitor counter is stopped at block 406.

FIG. 4 shows a flow diagram of operations performed by one component of an exemplary utilization application during the calculation of the effective frequency.

Referring to FIG. 4, at block 500 the application initializes. At block 502, a performance monitor event type is initialized. At block 504 a system timer is read and saved as a value called "Time0." At block 506 a periodic call back event is enabled. This allows the operation shown in FIG. 5 to be executed periodically, for example every 300 milliseconds. Enabling periodic call back at block 506 may be implemented in a variety of manners including timer based interrupts, system management events, or operating system directed sleep requests that put a thread to sleep for discrete intervals of time.

Referring now to FIG. 5, at block 600 the periodic call back event is started. At block 602, the performance monitor counter is read and its value is saved as a value known as "Ticks". At block 604, the performance counter is reset to prevent overflow. At block 606, the system timer is read and saved as "Time1." At block 608 an "ElapsedTime" is calculated wherein: ElapsedTime=(Time1−Time0)*TickPeriod, and wherein TickPeriod is the period between each tick of a performance monitor, such as the performance monitor 204 shown in FIG. 6. More details of the performance monitor will be discussed below.

Referring to FIG. 5, at block 610, the time values are updated wherein Time1 is saved as Time0. This ensures that the calculated value for elapsed time is the actual time interval between the successive readings of the system timer. At block 612, an effective frequency is calculated, wherein EffectiveFreq=Ticks/ElapsedTime. At block 614, a percentage utilization for a processor of the CPU core 120 is calculated, wherein Percentage_Utilization=(EffectiveFreq/by Actual Frequency)×100.

Figure 6:
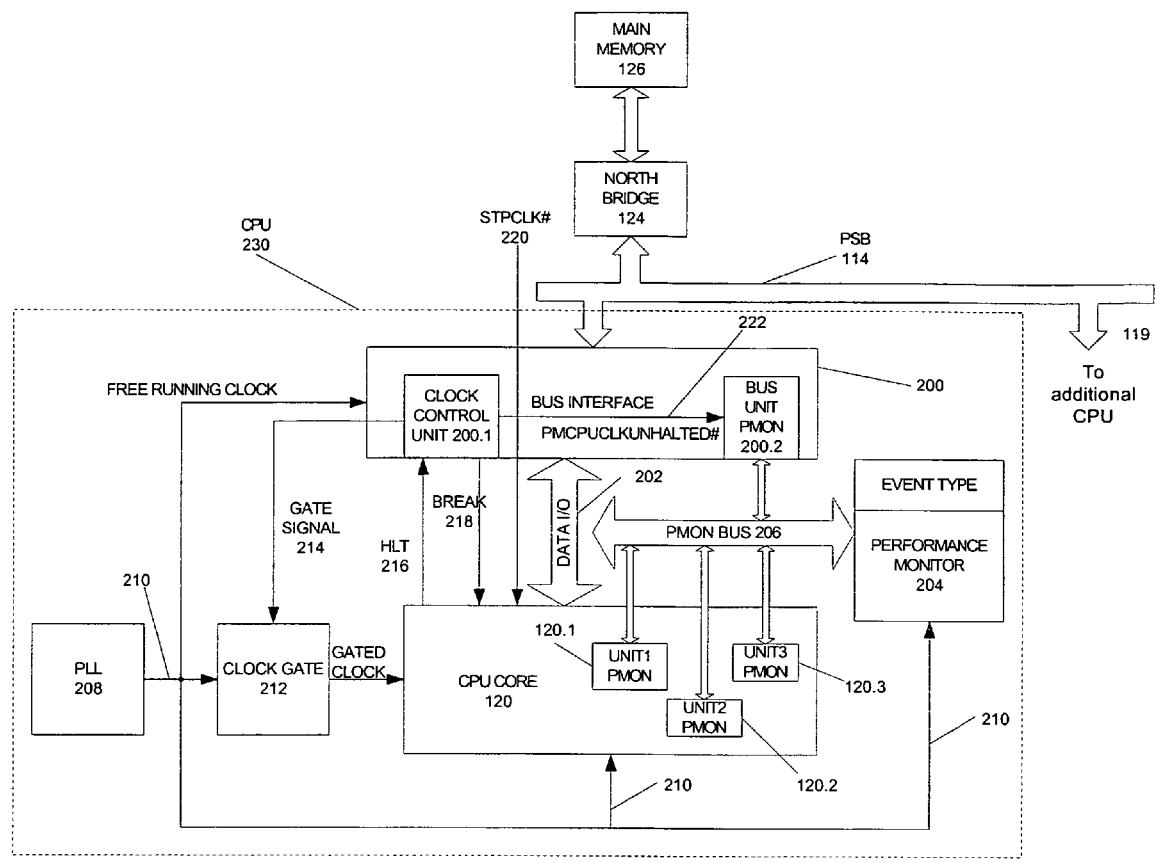
FIG. 6 illustrates one embodiment of the architecture of an exemplary data processing system.

FIG. 6 shows the architecture of a data processing system according to one embodiment of the present invention. Referring to FIG. 6, the data processing system includes a CPU 230, a north bridge circuit 124, and a main memory 126. The CPU 230 includes a CPU core 120. In one embodiment, the CPU core 120 has SMT technology enabled. SMT technology may provide two or more logical processors using a single physical processor such that the single physical processor can execute two or more threads substantially in parallel. One example of SMT is Hyper-Threading (HT) technology provided by Intel Corporation of Santa Clara, Calif.

In an alternate embodiment, the system has two or more physical processors such that the processors can execute a number of distinct threads substantially in parallel. Such a system is also referred to as a multiprocessor system. Referring to FIG. 6, the additional processors may be coupled to the North Bridge 124 through the PSB 114 as indicated by the additional arrow 119 in the PSB 114.

Communications between the CPU core 120 and north bridge circuit 124 occurs via a data pathway, which includes a processor system bus (PSB) 114, a bus interface 200, and a data input/output (I/O) bus 202. The bus interface 200 includes a clock control unit 200.1 and a performance monitoring (PMON) unit 200.2. Functions of the clock control unit 200.1 and the PMON unit 200.2 in the context of some embodiments of the present invention will be explained below.

The architecture shown in FIG. 6 includes a number of configurable performance monitors 204 (only one of which has been shown) to monitor various performance related aspects of the CPU core 120. The performance monitor 204 may include an on-die register (not shown) that is accessible via a high privilege or ring 0 application. The performance monitor 204 communicates with the PMON unit 200.2 and various other PMON units 120.1-120.3 within the CPU core 120 via a performance monitoring bus 206.

In one embodiment, the performance monitor 204 monitors an event type known as CPU_CLKS_UNHALTED so that the performance monitor 204 can monitor clock control signals from the CPU core 120 as described in greater detail below. A clock signal 210 may be generated by a phase locked loop (PLL) 208 and fed to the CPU core 120 via a clock gate 212. In one embodiment, the clock gate 212 gates off or de-asserts the clock signal 210 whenever the clock control unit 200.1 generates a gate signal 214. The clock signal may be also fed directly to the CPU core 120. Many components within the CPU core 120 use the gate signal 214. However, some components may use the clock signal 210.

The clock control unit 200.1 generates the gate signal 214 in response to the halt (HLT) signals 216 and break (BREAK) signals 218 from the CPU core 120. The CPU core 120 may send HLT signals 216 to turn off clocking to one of the functional units of the CPU core 120. If the bus interface 200 is busy, then the HLT signals 216 are ignored, otherwise the clock control unit 200.1 sends the gate signal 214 to gate the clock signal 210. The CPU core 120 asserts the BREAK signals 218 when the clock signal 210 is to be ungated. The bus interface 200 may ungate the clock signal 210 due to some PSB 114 activity even when the break signal 218 is not asserted. In this case, the CPU core 120 continues to send the HLT signals 216 until the PSB 114 activity subsides. The HLT signals 216 may be generated either directly by software (e.g., microcode) or indirectly by hardware (e.g., sleeping thread counters).

In one embodiment, some motherboard logic (not shown) generates a stop clock (STPCLK#) 220 signal that passes through the bus interface 200 with little processing. The bus interface 200 matches the STPCLK# signal 220 with the clock signal 210 which represents a free-running clock or a system clock.

One should appreciate that the CPU core 120 may assert the HLT signals 216 for execution of an Auto Halt instruction, a STPCLK# assertion, internal faults, etc. Events that cause the BREAK signal 218 to be asserted may include STPCLK# de-assertion, external interrupts, resets, etc.

In one embodiment, the clock control unit 200.1 uses the HLT signals 216 and BREAK signals 218 generated during a clock cycle of the clock signal 210 to generate another signal known as PMCPUCLKUNHALTED#222. PMCPUCLKUNHALTED#222 is input to the bus PMON unit 200.2.

A high privilege application in the form of a ring 0 driver may be used to configure performance monitor 204 to monitor an event known as CPU_CLKS_UNHALTED. In one embodiment, whenever the CPU_CLK_UNHALTED event selection is detected, the PMON bus 200.2 drives the PMCPUCLKUNHALTED# signal 222 onto PMON bus 206. This causes a register of performance monitor 204 to increment on each core clock that assertion of the PMCPUCLKUNHALTED# signal 222 is detected. Thus, in effect, the performance monitor 204 serves as a counter to measure a length of time (in terms of ticks) for which the CPU core 120 has requested clock control unit 200.1 to allow the clock signal 210 to be asserted. Since the CPU core 120 executes application code when the clock signal 210 is asserted, the length of time that the PMCPUCLKUNHALTED# signal 222 is asserted is the length of time in a cycle of the system clock during which the CPU core 120 is used.

Some embodiments of the present invention include a utilization application that includes the high privilege or a ring 0 driver to configure and read performance monitor 204 during a time sampling interval as described above. Furthermore, the utilization application may include a low privilege or ring 3 application to use the ring 0 driver to control the performance monitor 204 to monitor the PMCPUCLKUNHALTED# signal 222 in order to calculate the processor utilization within the CPU core 120.

Figure 7:
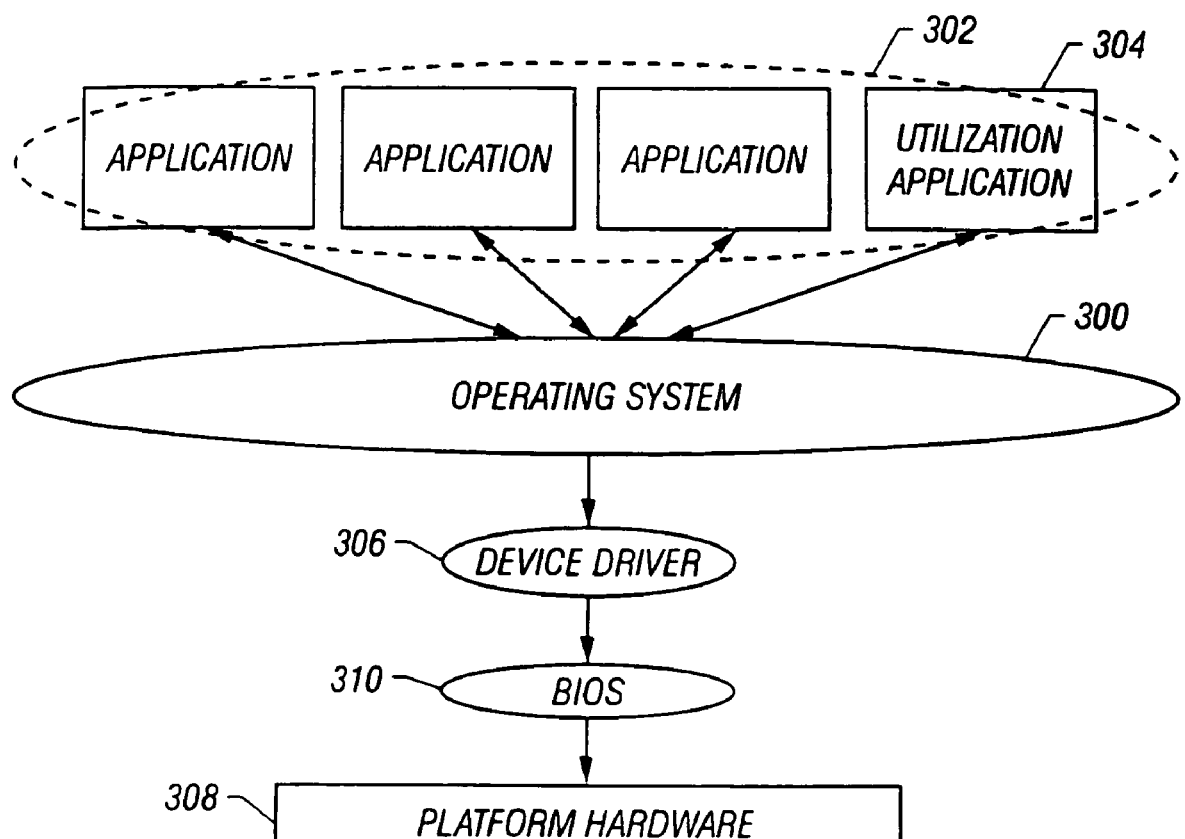
FIG. 7 illustrates an architectural system diagram depicting the operation of a data processing system according to one embodiment of the present invention.

Referring now to FIG. 7, an architectural system diagram depicting the operation of a data processing system according to one embodiment of the present invention is illustrated. In the illustrated embodiment, a plurality of application programs 302 such as the processor utilization application 304 interact with various platform hardware devices 308 including, such as, the CPU core 120 illustrated in FIG. 2, via an operating system 300 such as the Windows™ operating system from Microsoft Corporation, one or more device drivers 306, and basic input/output system (BIOS) code 310. The illustrated system is interrupt-driven both with respect to the multitasking of the various applications 302 and communication between applications 302 and platform hardware 308.

Accordingly, in one embodiment, an application 302 requests for a hardware resource from within platform hardware 308 can cause an interrupt, such as a System Control Interrupt (SCI) or a System Management Interrupt (SMI) to be generated and an interrupt handler routine to be responsively executed. A device driver 306 and BIOS 310 enable interaction between the operating system 300 and platform hardware 308. In one embodiment, BIOS 310 contains information such as physical device addresses of the various devices 308 coupled to the data processing system 100 and is useful with respect to the actual transmission of data. By contrast, device driver 306 is typically specific to a particular hardware device and is usually concerned with the translation of data between various device formats.

The utilization application 304 may include a periodically executing applet or application. Each time the applet is executed, the processor utilization is determined as described above.

As noted above, the performance monitor 204 increments when the CPU core 120 is not in an idle state or a similar state. Thus, in one embodiment, the ring 0 driver application 306 starts and stops the performance monitor 204 based on a power state of the CPU core 120 as illustrated in FIG. 3 above. The count result is used to determine processor utilization. Furthermore, the performance monitor 204 may include multiple counters in a multi-processor system or a SMT system to keep track of the time of each individual physical processor or logical processor spent in a certain power state. However, the counts returned by these counters may be incorrect if these counters are interrupted in the middle of counting. Such potential interruption may be reduced in one embodiment of a process to determine processor utilization as discussed above with references to FIG. 2.

Figure 8A:
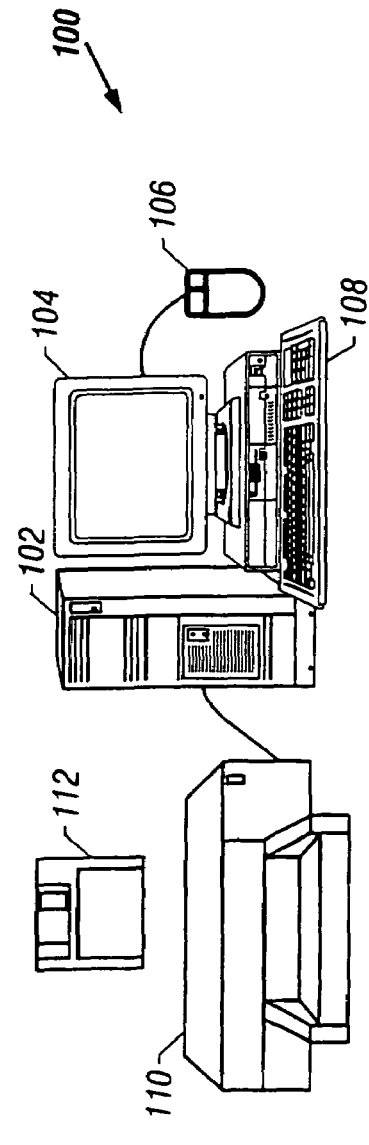
FIG. 8A illustrates an exemplary embodiment of a data processing system.

Referring now to FIG. 8A, a conventional data processing system 100 useable with some embodiments of the present invention is illustrated. Data processing or computer system 100 is comprised of a system unit 102, output devices such as display 104 and printer 110, and input devices such as keyboard 108, and mouse 106. Data processing system 100 receives data for processing by the manipulation of input devices 108 and 106 or directly from fixed or removable media storage devices such as disk 112 and network connection interfaces (not shown). Data processing system 100 then processes data and presents resulting output data via output devices such as display 104, printer 110, fixed or removable media storage devices like disk 112 or network connection interfaces.

Figure 8B:
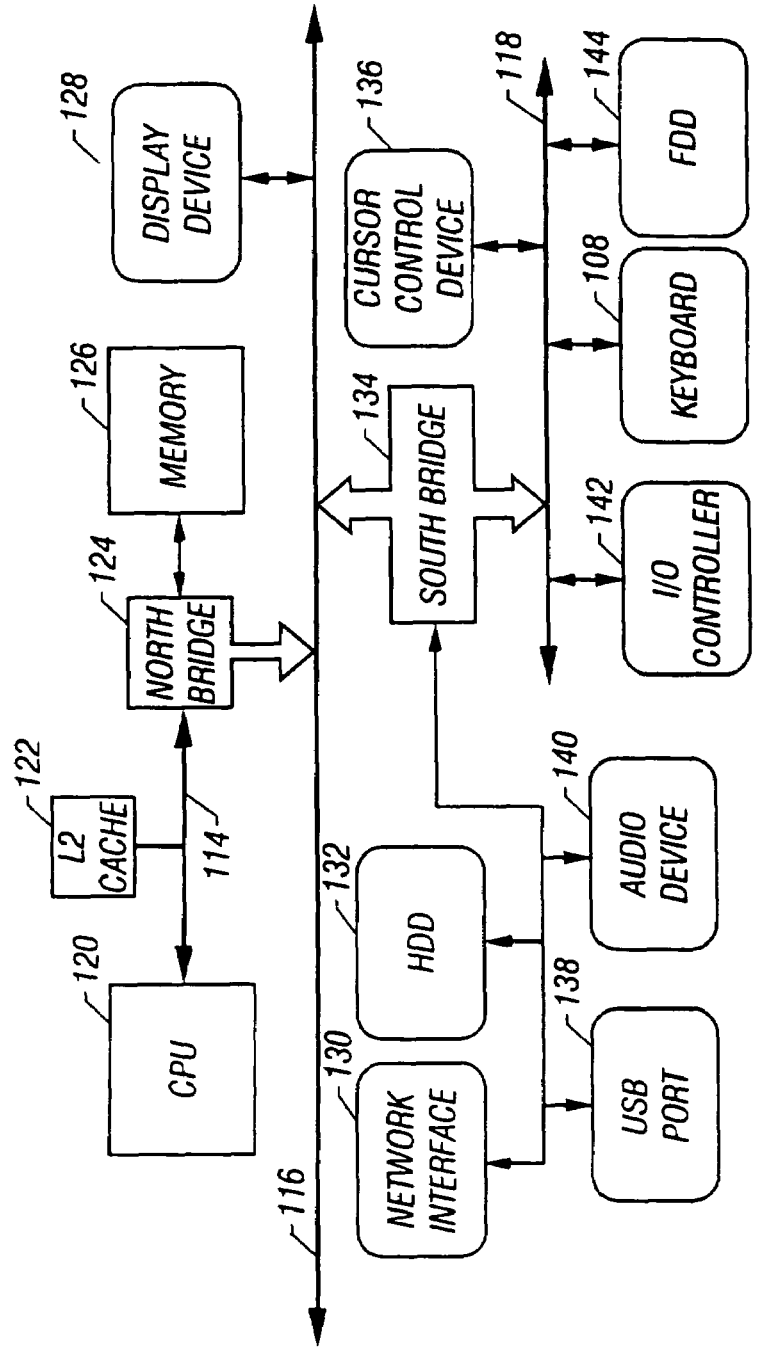
FIG. 8B illustrates an exemplary architecture of the data processing system depicted in FIG. 8A.

Referring now to FIG. 8B, there is depicted a high-level block diagram of the components of a data processing system 100 such as that illustrated by FIG. 1A. In an exemplary computer system, system unit 102 includes a processing device such as central processing unit (CPU) 120 connected to a level two (L2) cache 122 over a processor system bus (PSB) 114. Processor system bus (PSB) 114 is in turn coupled to an expansion bus such as local bus 116 and a memory 126 via a north bridge circuit 124. Local bus 116 may include a peripheral component interconnect (PCI), a Video Electronics Standards Association (VESA) bus or the like, coupled to CPU core 120 and PSB 114 to permit high-speed access to select devices such as display device 128.

Memory 126 may include read-only (ROM) and/or random access (RAM) memory devices such as a synchronous dynamic random access memory (SDRAM) module capable of storing data as well as instructions to be executed by CPU 120. Access to data and instructions stored within memory 126 is provided via a memory controller (not shown) within north bridge circuit 124. L2 cache 122 is similarly used, typically in a hierarchical manner, to store data and instructions for direct access by CPU 120. Display device 128 may include a cathode ray tube (CRT) display such as display 104, liquid crystal display (LCD), or a similar device for displaying various kinds of data to a computer user. For example, image, graphical, or textual information may be presented to the user on display device 128. System unit 102 of data processing system 100 also features an expansion or "compatibility" bus 118 such as the Industry Standard Architecture (ISA) bus, and a south bridge circuit 134 coupling it to local bus 116 to facilitate the attachment of other, relatively slower devices to the system 100. South bridge circuit 134 includes a universal serial bus (USB) port 138 as well as other direct connections for devices such as a network interface card 130, a data storage device, such as a magnetic hard disk drive 132, and an audio device 140 such as a speaker or sound card.

Other devices not directly coupled to south bridge 134 may be coupled to the system 100 via the expansion bus 118 as illustrated. A floppy disk drive (FDD) 144 providing additional data storage capacity on removable media storage devices such as disk 112, and input devices such as a keyboard 108 and a cursor control device 136 are each coupled to expansion bus 118 in this manner to communicate data, instructions, and/or command selections to central processing unit 120. Cursor control device 136 may comprise a conventional mouse, such as mouse 106 of FIG. 1A, a trackball, or any other device to allow cursor manipulation. Similarly, expansion bus 118 includes an input/output (I/O) controller having standard serial and parallel port functionality for connecting other I/O devices such as printer 110 to the system.

The system of one embodiment of the present invention may include software, information processing hardware, and various operations. The features and operations of some embodiments of the present invention may be embodied in machine or computer executable instructions embodied within one or more machine-readable media. The instructions can be used to cause a general purpose or special purpose processor such as CPU core 120, which is programmed with the instructions to perform the described operations. Alternatively, the features or operations of some embodiments of the present invention may be performed by specific hardware components that contain hard-wired logic for performing the operations, or by any combination of programmed computer components and custom hardware components.

For the purposes of this specification, a machine-readable medium includes any mechanism that provides (i.e. stores and/or transmits) information in a form readable by a machine (e.g. computer) for example, a machine-readable medium includes read-only memory (ROM), random access memory (RAM), magnetic disk storage media, optical storage media, flash memory devices, electrical, optical, acoustical, or other form of propagated signals (e.g. carrier waves, infra red signals, digital signals, etc.), etc.

Although the current description is made with reference to specific exemplary embodiments, it will be evident that various modification and changes can be made to these embodiments without departing from the broader spirit and scope of the appending claims. Accordingly, the specification and drawings are to be regarded in an illustrative sense rather than in a restrictive sense.

What is claimed is:

1. An apparatus comprising:
  a plurality of processors, wherein one of the plurality of processors is operable to cause remaining processors of the plurality of processors to pause execution of a plurality of threads before initiating a frequency calculation thread on the one of the plurality of processor to prevent interrupting the frequency calculation thread; and
  a bus coupling the plurality of processors to each other.

2. The apparatus of 1, further comprising a performance monitor counter coupled to each of the plurality of processors to keep track of when the processor is active.

3. The apparatus of 2, the performance monitor counter to provide a count for determining the processor utilization.

4. The apparatus of claim 1, wherein the plurality of processors comprise a plurality of logical processors to execute threads simultaneously.

5. The apparatus of claim 1, wherein execution of the predetermined unit of code causes the remaining processors to pause.

6. A method comprising:
preparing to initiate a frequency calculation thread on one processor of a plurality of processors in a data processing system, said preparing comprising
pausing execution of a plurality of threads on remaining processors of the plurality of processors to prevent interrupting the frequency calculation thread;
initiating the frequency calculation thread after pausing the execution of the plurality of threads; and
resuming the execution of the plurality of threads when execution of the frequency calculation thread has been completed.

7. The method of claim 6, wherein preparing to initiate the frequency calculation thread further comprises:
firing a wait synchronization event from the one processor of the plurality of processors to the remaining processors of the plurality of processors; and
waiting for acknowledgement from the remaining processors of the plurality of processors before initiating the frequency calculation thread.

8. The method of claim 6, wherein the plurality of processors comprise logical processors.

9. The method of claim 6, wherein the plurality of processors comprise physical processors.

10. A physical machine-accessible tangible medium that provides instructions that, if executed by a processor, will cause the processor to perform operations comprising:
preparing to initiate a frequency calculation thread on one processor of a plurality of processors in a data processing system, said preparing comprising
pausing execution of a plurality of threads on remaining processors of the plurality of processors to prevent interrupting the frequency calculation thread;
initiating the frequency calculation thread after pausing the execution of the plurality of threads; and
resuming the execution of the plurality of threads when execution of the frequency calculation thread has been completed.

11. The physical machine-accessible tangible medium of claim 10, wherein preparing to initiate the frequency calculation thread further comprises:
firing a wait synchronization event from the one processor of the plurality of processors to the remaining processors of the plurality of processors; and
waiting for acknowledgement from the remaining processors of the plurality of processors before initiating the frequency calculation thread.

12. The physical machine-accessible tangible medium of claim 10, wherein the plurality of processors comprise logical processors.

13. The physical machine-accessible tangible medium of claim 10, wherein the plurality of processors comprise physical processors.

* * * * *

UNITED STATES PATENT AND TRADEMARK OFFICE
CERTIFICATE OF CORRECTION

PATENT NO.       : 7,617,488 B2                                           Page 1 of 1
APPLICATION NO.  : 10/750395
DATED            : November 10, 2009
INVENTOR(S)      : Srinivasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Nineteenth Day of October, 2010

David J. Kappos
*Director of the United States Patent and Trademark Office*